INVENTOR.
NORMAN LOUIS WEINBERG
BY
ATTORNEY

United States Patent Office 3,679,534
Patented July 25, 1972

3,679,534
ELECTROCHEMICAL FORMATION OF
BONDED STRUCTURES
Norman Louis Weinberg, Williamsville, N.Y., assignor to
American Cyanamid Company, Stamford, Conn.
Filed Feb. 9, 1971, Ser. No. 113,923
Int. Cl. B32b 3/12, 15/04, 31/04
U.S. Cl. 161—68
10 Claims

ABSTRACT OF THE DISCLOSURE

Compositions and methods for the generation of bonded structures through the electrochemical conversion of a precursor to a curing agent within an adhesive composition are disclosed.

This invention relates to certain compositions and methods for the electrochemical formation of bonded structures. In particular, it concerns compositions and methods in which electrically conductive members are bound by an adhesive. Curing of the adhesive is achieved through the electrochemical conversion of a curing agent precursor to a reactive curing agent.

In the past metal laminates have conventionally been formed by bonding the metallic layers together with one or more thermosetting adhesives. Typically, the adhesive is a synthetic resin which, upon curing, undergoes an irreversible chemical and physical change to produce a substantially infusible and insoluble bond.

Such conventional procedures typically have one or more of the following disadvantages.

Where single-component adhesives are employed, they must be stored under refrigeration to prevent premature curing.

Two types of multicomponent adhesives are commonly employed, namely, those which cure under ambient conditions and those which require heating to effect a cure. In the former case, one must prepare the adhesive, apply it to the substrate and complete the final assembly of the structure before the composition cures. Furthermore, excess adhesive is wasted and the application equipment must be immediately cleaned to prevent the formation of cured adhesive in undesired places.

Employment of thermally cured adhesives is limited to bonding in structures which are thermally insensitive. These systems are also marred by a lack of efficient use of energy and the inconvenience encountered in attempting to achieve uniform heating on large structures such as the metallic skins of a building or vehicle.

Accordingly, it is an object of this invention to provide compositions and a convenient method for the preparation of bonded structures of electrical conductors. A further object is to provide a convenient bonding process employing storage stable adhesives which are efficiently cured by a non-thermal process. These and other objects of the present invention will become apparent from the following description and examples.

It has been found that by disposing an electrolytically conductive adhesive composition containing a curing agent precursor from which a curing agent is electrolytically formed, between two or more conductive surfaces, a bonded structure can be conveniently prepared by passing an electrical current through the assembled composition.

Accordingly, in one aspect, the invention relates to the process of disposing the electrically conductive adhesive composition between the conductive members to be bound. This is followed by an electrolysis step in which an electric current is passed through the laminar composition to effect the electrochemical conversion of the curing agent precursor to the curing agent, thereby securing the conductive members together. In another aspect, the present invention relates to the laminar manufactures comprising two or more conductive members having a curable, electrically conductive adhesive composition disposed therebetween. It further relates to the laminar articles produced by the electrochemical cure of said manufactures.

In the practice of the present invention the conductive members, which serve as electrodes for the electrolytic activation of the curing agent precursor, may be composed of a wide variety of electrically conductive materials in a variety of configurations. Suitable materials include, for example, graphite, copper, aluminum, titanium, iron, silver, alloys of these metals, and the like. These materials can be fabricated in a variety of forms, such as, conductive sheets, expanded metal surfaces, wires disposed in parallel relation or in gridworks, fabrics, and the like.

Three embodiments of the laminar compositions of the present invention are depicted in the accompanying drawings.

Figure 1:
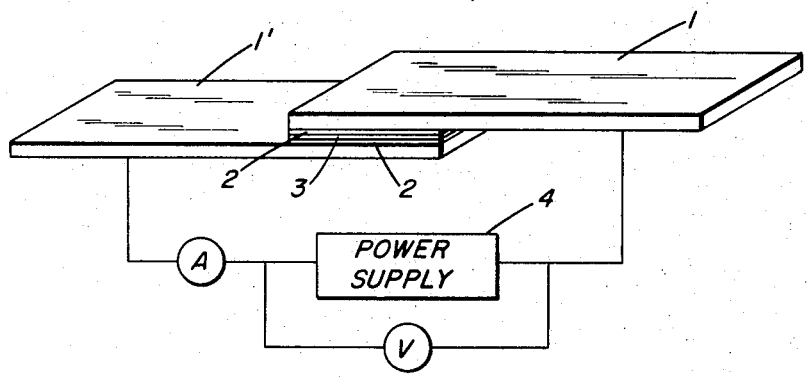
FIG. 1 is a perspective view which shows the use of an electrochemically cured adhesive to bind together two metallic plates.

In the bonding operation illustrated in FIG. 1, the adhesive composition, element 2, is applied to a non-conductive fabric, element 3, and disposed between conductive elements 1 and 1'. An electric power supply, element 4, is attached to the conductive elements, thereby effecting the electrochemical curing of the adhesive with the concomitant bonding of elements 1 and 1'. Symbols V and A are optional volt meters and ammeters.

The non-conductive fabric is optionally employed to serve as a support for the adhesive composition. Where the adhesive selected has low dimensional stability, the fabric, e.g., nylon web, serves to retain the separation of the electrodes, e.g., aluminum plates, thereby precluding a short circuit.

Figure 2:
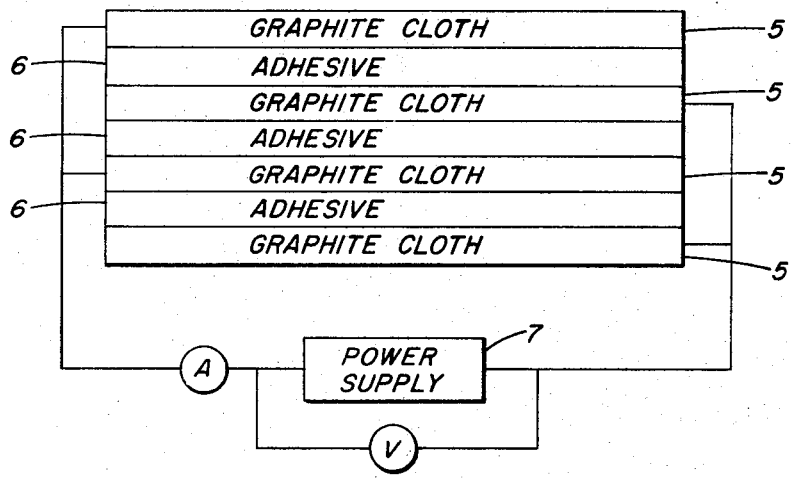
FIG. 2 is a schematic representation of a laminar construction composed of a plurality of electrodes.

The formation of laminates with a plurality of non-metallic conductors is schematically represented in FIG. 2. In this bonding method, alternate layers of graphite cloth, carbon fibers or the like, element 5, are disposed between adhesive layers, element 6. The electrodes, 5, are connected to a power supply, element 7, with adjacent electrodes connected to opposite poles thereof. The separation of layers is exaggerated for purposes of description.

Figure 3:
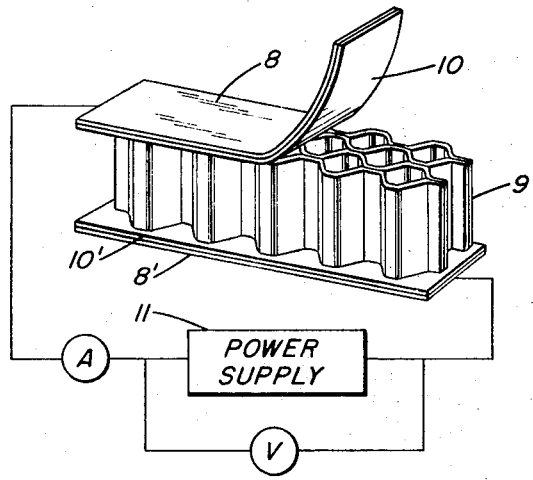
FIG. 3 is a perspective view, showing the use of an electrochemically cured adhesive to bind together a honeycomb core, a support plate and aircraft skin.

A process for the formation of a structure having a honeycomb core is illustrated in FIG. 3. The core, element 9, composed of electrically conductive material, such as aluminum, is coated with an adhesive film, elements 10 and 10'; and then sandwiched between two conductive elements, 8 and 8', such as, an aircraft skin and support plate. The resulting structure is connected to a power supply, element 11, to secure elements 8 and 8' to the core material.

The thickness of the adhesive layers can be widely varied in the practice of the present invention, depending upon the materials selected and characteristics of the product desired. Generally, layers having thicknesses in the range of from about .001 inch to about 1 inch are suitable. Where thick layers are being employed and more rapid rates of electrolysis are desired, this can generally be achieved by reducing the layer thickness. Excessive thinness can cause shorting problems.

It is generally preferred to employ the adhesive composition in layers of uniform thickness and composition. They can be applied to the conductive substrate by conventional application means, such as, with a Mayer rod, fixed blade, spray or brush techniques and the like. Where non-conductive support webs are employed, the web can be coated directly and then sandwiched between the conductive elements or merely sandwiched between two adhesive coated conductive elements. The web must be sufficiently loose to permit permeation thereof by the electrically conductive adhesive or the electrolysis will be prevented.

Where the adhesive composition selected is insufficiently conductive to carry out the electrolysis, a supporting electrolyte may be added. In general, any electrolyte which is to some degree soluble in the particular adhesive composition employed can be used. The quaternary ammonium salts having lower alkyl groups in the $C_1$ to $C_4$ range are among the preferred electrolytes. Any conventional anion is generally suitable for use in combination with the ammonium cation.

Some of the preferred supporting electrolytes are illustrated by the following: tetraloweralkylammonium halides ($C_1$–$C_4$), p-toluenesulfonates, perchlorates, and fluoroborates, such as, tetramethylammonium chloride, bromide and iodide; tetraethylammonium chloride, bromide and iodide; tetrabutyl ammonium, chloride, bromide and iodide; methyl - tributylammonium fluoroborate; toluenesulfonate; other preferred compounds include benzyl and phenyl ammonium salts, such as phenyl-trimethylammonium bromide and benzyl-trimethylammonium fluoroborate; sodium salts, e.g., sodium tetraphenylborate and perchlorate. Solvents, such as 1-$C_4H_9OH$, $NO_2CH_3$, $CH_2Cl_2$, etc., may be advantageously employed in combination with the electrolyte selected.

In general, any source of direct electric current can be employed to effect the electrolysis. A D.C. power source having a voltage in the range of from about 10 to about 500 volts and capable of delivering current densities in the range of from about $10^{-4}$ to about 1 amp./cm.$^2$ are generally advantageously employed. It is generally preferred to employ a reversal of current flow at intervals of from about 1 second to 3 minutes to avoid polarization problems.

The optimum period of electrolysis will, of course, depend upon the materials selected, the quantities used, the characteristics required or desired in the bonded structure as well as the electric current employed. One advantage of the present electrochemical process is that one can calculate a number of coulombs theoretically required and employ that quantity of current since the value actually required corresponds relatively well to that theoretically required.

Among the wide variety of adhesives which may be electrochemically cured in accordance with the present invention, it is generally preferred to employ synthetic organic adhesives of the thermosetting resin type. The seven principal classes of adhesives therein are those formed by the reaction of urea, melamine, phenol or resorcinol with formaldehyde, the epoxy resin adhesives, polyisocyanate adhesives and polyester resin adhesives. In the practice of the present invention, the adhesive selected is formulated in a conventional manner substituting a precursor for the usual curing agent. The precursor is that compound which when reduced or oxidized by electrolysis produces the curing agent; thus, enabling the preparation of a single pot adhesive composition which is stable under ambient conditions and is conveniently cured at the desired time through electrolysis.

As used herein, the expression "curing agent" is intended to include both those compounds which catalyze curing reactions, such as, basic anhydrides and the Lewis acids commonly employed in the polymerization of external and internal epoxides, as well as reactants which chemically combine with other ingredients from which the adhesive is formed, such as, formaldehyde, in the case of phenolic and amino resin adhesives.

Urea resin adhesives are conventionally made by the condensation reaction of urea with 1.5–2 moles of formaldehyde. For room temperature curing, the composition is conventionally mixed with an acid catalyst, such as ammonium chloride, and applied to the substrates, which are assembled under pressure. In the practice of the present invention, a methanol precursor provides additional formaldehyde and acid. Cure would be effected by passing a current through the assembled structure, thereby electrochemically converting the methanol to formaldehyde within the adhesive composition.

Melamine formaldehyde resins are conventionally prepared by reacting melamine with three moles of formaldehyde under slightly alkaline conditions. As in the case of the urea formaldehyde resins, methanol is employed as a precursor. It is electrochemically converted to a $CH_2O$-acid curing agent mixture in the practice of the present invention.

Storage-stable, one pot phenolic adhesives are commonly known as novolacs. They are prepared by reacting phenol with formaldehyde in mole ratios of from about 1:0.8 to 1:1. The reactants are usually condensed in the presence of an acid catalyst, for example, oxalic acid. Cross-linking is achieved by the addition of hexamethylene tetraamine or other latent source of formaldehyde which, upon heating, decomposes, releasing the reactants and thereby effecting a cure. In the practice of the present invention, methanol would be substituted for the formaldehyde source conventionally used. Instead of thermally catalyzing the cross-linking reaction, curing is effected by electrolyzing the composition, thereby forming the formaldehyde within the adhesive composition. Where additional cross-linking is desired in thermally insensitive structures, the use of elevated temperatures in combination with the electrochemical formation of the curing agent may be of advantage.

Unmodified resorcinol resins are conventionally prepared by the partial reaction of resorcinol with formaldehyde in molar ratios of from 1:0.6 to 1:0.65. The condensate is then diluted with a solvent, such as ethanol, to which a source of formaldehyde, such as paraformaldehyde, is added. The resulting solution is applied to the substrates to be bound. Most of the alcohol is allowed to In the electrochemical process of the present invention, the partially reacted resorcinol-formaldehyde composition is diluted with methanol. The diluted condensate is sandwiched between the conducting surfaces to be bound and the assembly is electrolyzed to effect the formation of formaldehyde within the adhesive composition. Due to the expense of these resins, a mixture of reactants, such as a phenol-resorcinol resin, may be preferably employed in the practice of the present invention.

Epoxy resins are commonly used as adhesives. One common resin is the condensation product of epichlorohydrin and bisphenol A (4,4'-isopropylidenediphenol). These resins are typically highly viscous liquids with epoxy equivalent weights of from about 170 to about 450 being generally preferred. They are typically prepared from compounds having an average of more than one epoxy group per molecule and capable of being converted through these groups to cured resinous products.

Many epoxy resins are prepared from epichlorohydrin and hydroxyl compounds, which typically include, for example, bisphenol A or 4,4'-isopropylidenediphenol, 4,4-isopropylidenebis(2,6-dibromophenol), resorcinol, phenol-formaldehyde novolac, o-cresol-formaldehyde novolac, p-aminophenol, 1,1,2,2-tetra(p-hydroxyphenyl)ethane, 1,4-butanediol, glycerol, poly(oxypropylene)glycol, linoleic dimer acid, 1,1,3-ris(p-hydroxyphenyl)-propane and the like.

The diglycidyl ether of bisphenol A, abbreviated DGEBA, may be represented by the following formula:

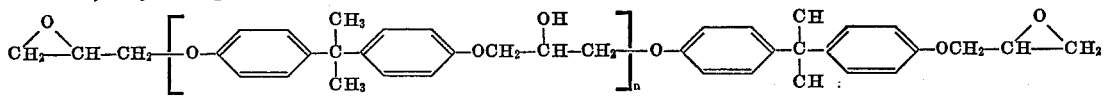

wherein $n$ is a positive integer or fraction thereof.

Some other common compounds are represented below, wherein $n$ has the same significance:

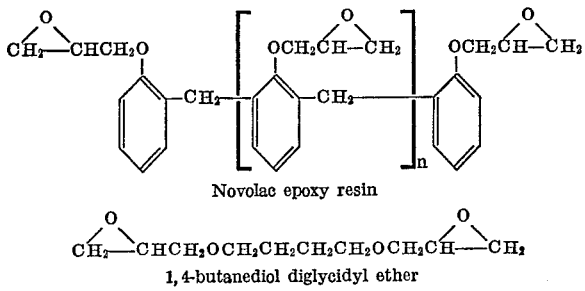

Novolac epoxy resin $$CH_2\text{---}CHCH_2OCH_2CH_2CH_2CH_2OCH_2CH\text{---}CH_2$$

1,4-butanediol diglycidyl ether

Epoxy resins, such as those set forth above, are typically cured by addition of reactive or catalytic hardeners which are added immediately before application of the adhesive. These adhesives are most preferably employed in the practice of the present invention due to the fact that they demonstrate high adhesion to metals with low shrinkage. These compositions thus enable the formation of adhesive joints showing good resistance to fatigue, creep, heat, moisture and solvents. Amines are reactive hardeners. They include alkyl-amines, such as dimethylamine, ethylenediamine, N,N - dimethylaminopropylamine, triethylenetetramine, N,N-diethylaminopropylamine, tetraethylenepentamine N,N - diethylaminoethanol, N,N-dimethylaminoethanol, N-(2 - hydroxypropyl)ethylenediamine, cyanoethylated polyamines, such as those formed by the reaction of acrylonitrile and diethylenetriamine, cycloaliphatic polyamines, such as piperidine, aminoethylpiperazine, menthanediamine, m - xylylenediamine, m-aminobenzylamine and 3,5-(diaminomethyl)aniline; aromatic amines, such as aniline, m-phenylene diamine, p,p'-methylenedianiline, diaminodiphenylsulfone, pyridine, 2,6 - diaminopyridine, 4-chloro-o-phenylene diamine, 2-methylimidazole and pyrrolidine; tertiary amines, such as benzyldimethylamine, triethylamine, dimethylaminomethylphenol, 2,4,6 - tris - (dimethylaminomethyl)phenol, ethyl diethanolamine and 1-methylbenzyldimethylamine; and blends of one or more of the above amines.

The amino functions of the above curing agents can be conveniently prepared by electrolysis of the corresponding nitro, nitroso, oxime, imine, a tert-amine salt, metal amine complex and carboxylic acid or mineral acid salts of the amines.

Electrochemical syntheses of amine curing agents generally suitable for curing any epoxy adhesive are schematically set forth below:

(1) Amine formation from a carboxylic acid salt

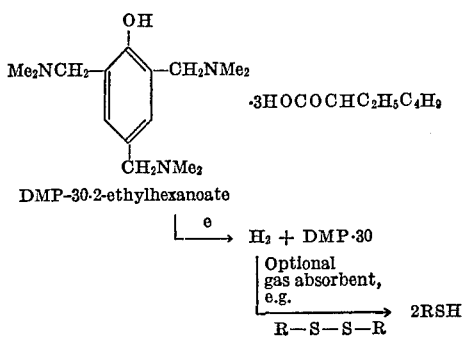

(2) Amine formation from a nitro compound

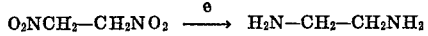

(3) Amine formation from a nitroso compound

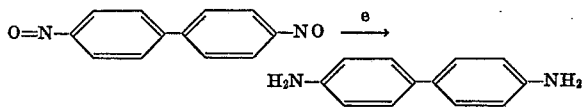

(4) Amine formation from an oxime compound

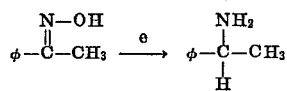

(5) Amine formation from an oxime

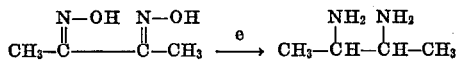

(6) Amine formation from imine compounds

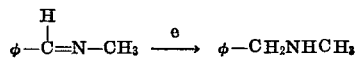

(7) Amine formation from metal complexes

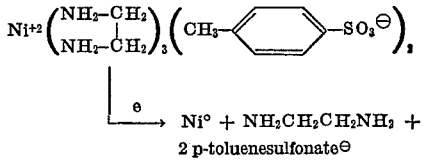

(8) Amine formation from tert-amine salts

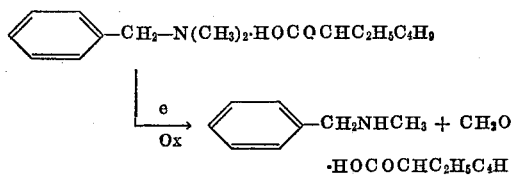

It is apparent that a variety of compounds can serve as precursors to the above amine curing agents. For example, the corresponding amides, oximes, nitroso compounds, nitro compounds, cyano compounds, amine salts, such as those formed by reacting an amine with a carboxylic or mineral acid and the like can be electrolyzed to amines within the conductive adhesive compositions of the present invention.

Metal-amine complexes are also commonly used in curing epoxy adhesives. Boron trifluoride-ethylamine adducts are commonly employed for this purpose. They are incorporated into the adhesive composition and heated to initiate a cure. In the process of the present invention, the boron trifluoride-amine adducts or other metal-amine complexes, such as trans-dichlorobisethylenediamine-cobalt (III), tris-(ethylenediamine)-nickel chloride, diethylenetriamine-molybdenum nitrate and the like are incorporated into the adhesive compositions and electrolytically activated rather than decomposing them thermally.

Anhydrides, such as phthalic anhydride, chlorendic anhydride, dodecenylsuccinic anhydride, dichloromaleic anhydride, hexahydrophthalic anhydride, nadic methyl anhydride, pyromellitic dianhydride and trimellitic anhydride are employed in curing epoxy resins due to the fact that they generally have reactive and may have catalytic action therein.

Furthermore, as in the case of the aromatic amines previously discussed, aromatic or condensed ring anhydrides are commonly employed to provide cured, adhesive bonds in articles where heat resistance is important. They are also commonly employed with resins having more than two epoxy groups, such as the polyglycidyl ethers of novolacs and other polyphenols. In the practice of the present invention, a catalytic amount of a tertiary amine precursor is employed in combination with the anhydride. The tertiary amine which is liberated during electrolysis enters a salt-forming reaction with the anhydride curing agent thereby initiating a cure in the epoxy adhesive.

Dibasic carboxylic acids, such as oxalic acid, succinic acid and phthalic acid; and, monobasic acids, such as 2-ethylhexanoic acid are also commonly employed in curing epoxy resins. In the practice of the present invention, the corresponding alcohols, anhydrides or inert amine salts constitute convenient precursors from which the acids are prepared within the adhesive composition by electrolysis.

Organic disulfides also form a convenient class of curing agent precursors for use in curing epoxy resins. In this case, the disulfide is electrolyzed to the conventional mercaptan curing agents. Illustrative disulfides include, for example, aromatic disulfides, such as phenyl disulfide, 1,8-naphthalene disulfide; benzyl disulfide; cycloaliphatic disulfides having from 2 to 20 cyclic methylene groups; and, the disulfides prepared from the conventional liquid polysulfides employed to cure and modify epoxy resins, such as the mercaptan terminated liquid polysulfides formed by the reaction of bis-(2-chloroethyl)-formal, an aliphatic polychloride and sodium polysulfide. Suitable liquid polysulfides include, for example, the 500–700 M.W., low viscosity polymer, LP–8 by Thiokol Chemical Corp. and their 1,000 M.W. polymer LP–3.

The disulfides can be used alone or in conjunction with amine precursors which give tris(dimethylaminomethyl) phenol, triethylenetetraamine, diethylenetriamine, etc. by electrolysis.

It will be readily apparent that mixed functional derivatives can also be employed in the practice of the present invention, for example, the ammonium salt of o,o'-dicarboxyphenyldisulfide, o-carboxyaniline, p,p'-dinitrophenyldisulfide, and the like.

Polymers from polyisocyanate compounds can also be used in the practice of the present invention. Isocyanate adhesives are typically polymers having molecular weights in the range of from about 200 to about 1,000 prepared from isocyanate compounds having 2, 3 or more isocyanate groups per molecule. These compounds are conventionally cured by the addition of alcohols, amines, carboxylic acids, mercaptans and the like. In the practice of the present invention, these curing agents are electrochemically formed within the adhesive composition as described above in the case of the epoxy resins.

A variety of adhesives are polymeric compounds formed by free radical initiation. Successful preparation of one pot polymer adhesives which are initiated by free radicals generally requires the use of stabilizers and other precautions to exclude conditions which will cause premature initiation of the polymerization. These disadvantages are eliminated by electrochemically forming the free radical source from a suitable precursor. For example, in lieu of adding an organic peroxide, azo compound, alkyl nitrate, lead salt of a carboxylic acid, organocobalt compound or the like, one would employ the corresponding carboxylic acids to produce free radials via a Kolbe electrolysis.

Among the variety of these free radical cured adhesives one may mention poly(vinyl alkyl esters) such as poly (vinyl acetate), poly(vinyl propionate), poly(vinyl butyrate) and the like; poly(vinyl alkyl ethers), such as poly(vinyl methyl ethyl), poly(vinyl ethyl ether), poly (vinyl isopropyl ether), poly(alkyl acrylates) and the like.

2-cyano-acrylic ester polymers also are widely employed in the formation of laminar structures. 3-poly(alkyl 2-cyano-acrylates) which are commonly used are poly-(methyl 2-cyano-acrylate), poly(ethyl 2-cyano-acrylate) and poly(butyl 2-cyano-acrylate). Curing of these resins is typically effected by water or either a free radical initiator or through anionic initiation, achieved by the addition of a weak base, such as an alcohol. This is electrochemically achieved in the practice of the present invention by the electrochemical formation of the alcohol-base initiator or the free radical initiator from the appropriate precursor as described above in the case of the isocyanate adhesives and the vinyl polymer adhesives.

Polysulfide sealants and adhesives can also be electrochemically cured in the practice of the present invention. The polysulfide polymers are typically prepared by condensing an organic polyhalide with an inorganic polysulfide in aqueous suspension. The principal monomer is bis-2-chloroethyl formal. Sodium disulfide is the alkali polysulfide which is most commonly employed. Some speciality polymers also employ ethylene dichloride and, for cross-linking, the trihalide, 1,2,3-trichloropropane is also often employed. The polymers are prepared by a nucleophilic displacement reaction in which the sodium salts of the hydrogen polysulfide react with the terminal chlorines of the bis-2-chloroethyl formal. Curing of the high molecular weight product is conventionally achieved by reduction of some of the disulfide groups present to mercaptan terminal groups. This is achieved by reacting a polymer dispersion with sodium hydrosulfide and sodium sulfite. In the practice of the present invention the mercaptan groups are directly formed by electrolysis of the disulfide groups in the high molecular weight polymer.

It will be readily apparent that a wide variety of adhesives can be adapted for use in the present invention. Many are commercially available and others can be conveniently prepared by methods set forth in the technical literature such as Adhesion and Adhesives by R. Houwink and G. Salamon, vol. I, Elsevier Publishing Co. (1965); Handbook of Adhesives by I. Skeist, Reinholdt Publishing Corp. (1962) and references cited therein.

The following examples are included for purposes of illustration and are not limitative of the present invention disclosed therein. In each case, parts are by weight unless otherwise indicated.

EXAMPLES 1–18

Aluminum-adhesive-aluminum laminates are electrochemically formed with conventional epoxy resins and the curing agent precursor, supporting electrolyte and electrolytic conditions set forth in Table I below. In each case the structures to be bound consisted of two aluminum sheets having a three inch square surface area. The adhesive in each case was a 55/45 mixture by wt. of the following epoxy resins: DER 664® sold by the Dow Chemical Co., a solid DGEBA resin having an epoxy equivalent of about 875 to about 975 and a Durran's M.P. of about 95 to 105° C. and an Araldite RD–4® polymer having an epoxy equivalent of about 76 and a viscosity of about 20 centipoises, at about 25° C. Araldite® is sold by Ciba Products Company.

The resin mixture was combined with a curing agent precursor and supporting electrolyte indicated and the resulting mixture was applied to a nylon mesh separator. The coated mesh was sandwiched between the aluminum strips and the resulting laminate was electrolyzed with a current of about 20 ma. with an initial voltage of about 50. As the electrochemical curing began, the voltage slowly rose to about 350 v. Current direction was reversed periodically and the process continued until the indicated coulombs had been passed through the laminar structure.

The percentage of electrochemical cure achieved is indicated in Table I below. The adhesive layer thickness was approximately 0.75 mm. thick in each of the bonded structures.

TABLE I

| Example number | Curing agent precursor Compound | Wt. percent | Supporting electrolyte Compound | Wt. percent | Electrochemical cure Coulombs | Time (hrs) | Percent cure |
|---|---|---|---|---|---|---|---|
| 1 | 2-methylimidazole benzoate | 10 | | | 28.2 | 16 | 20 |
| 2 | Dimethylamine succinate | 10 | | | 18.8 | 0.3 | 5 |
| 3 | DmP-30 2-ethylhexanoate | 3 | [$C_6H_5CH_2(CH_3)_3BF_4$ in n-BuOH+$NO_2CH_3$] | 5, ~15 | | 0.25 | 64 |
| 4 | do | 3 | [$Et_4N^\oplus p\text{-}CH_3C_6H_4SO_3^\ominus$ in n-BuOH+$NO_2CH_3$] | 2, ~15 | 37.2 | 16 | 25.5 |
| 5 | do | 3 | [$MeBu_3N^\oplus BF_4^\ominus$ in n-BuOH+$NO_2CH_3$] | 3, 15 | 35 | 16 | 54 |
| 6 | Cyclohexanone oxime | 5 | $MeBu_3N^\oplus BF_4^\ominus$ | 3 | 20.7 | 0.3 | 18 |
| 7 | Benzalaniline | 5 | $Et_4N^\oplus p\text{-}CH_3C_6H_4SO_3^\ominus$ | 3 | 16.0 | 0.3 | 22 |
| 8 | Benzyldisulfide | 5 | $Et_4N^\oplus p\text{-}CH_3C_6H_4SO_3^\ominus$ | 6 | 16.8 | 0.3 | 51.2 |
| 9 | Azobenzene | 5 | $Et_4N^\oplus p\text{-}CH_3C_6H_4SO_3$ | 5 | 16.1 | 0.3 | 21.3 |
| 10 | Diphenyldisulfide | 10 | $Et_4N^\oplus p\text{-}CH_3C_6H_4SO_3^\ominus$ | 5 | 17 | 0.3 | 51 |
| 11 | Naphthalene 1,8-disulfide | 5 | $Et_4N^\oplus p\text{-}CH_3C_6H_4SO_3^\ominus$ | 5 | 20.3 | 0.3 | 35 |
| 12 | Diphenyldisulfide | 5 | $C_6H_5(CH_3)_3N^\oplus Br^\ominus$ | 5 | 17.3 | 0.3 | 15 |
| 13 | do | 5 | $(C_2H_5)_4N^\oplus Cl^\ominus$ | 5 | 22.3 | 0.3 | 35.7 |
| 14 | do | 10 | $(C_2H_5)_4N^\oplus Cl^\ominus$ | 5 | 26.7 | 0.3 | 47.2 |
| 15 | do | 10 | $Na^\oplus (C_6H_5)_4B^\ominus$ | 5 | 7.3 | 0.3 | 32.7 |
| 16 | do | 10 | $(C_4H_9)_4N^\oplus ClO_4^\ominus$ | 15 | 19.5 | 0.3 | 35 |
| 17 | do | 10 | $(C_4H_9)_4N^\oplus I^\ominus$ | 10 | 36 | 0.3 | 37.0 |
| 18 | do | 10 | $(C_4H_9)_4N^\oplus Br^\ominus$ | 10 | 23.5 | 0.3 | 38.0 |

EXAMPLES 19-22

A laminar structure of two aluminum sheets measuring 12 inches by 4 inches and having a thickness of 1/8 inch was prepared as shown in FIG. 1 above. The sheets were cleaned in a solution of dichromate and then bound together by sandwiching an epoxy resin adhesive composition supported on a nylon mesh between the sheets. The resin consisted of a mixture of DER 664® and Araldite RD-2® which was 55/45 parts by weight. The curing agent precursor and supporting electrolyte employed with the epoxy resin are as indicated in Table II below. The laminar composition, having a half-inch lap was cured by electrolysis at about 200 ma., with a reversal of current every 30 seconds. Within 10 minutes, the voltage rose from an initial value of about 30 v. to 350 v., which was the limit of the power supply employed (a Sargent Coulometric Current Source, Model IV). After the indicated number of coulombs had passed, lap-shear tests were made either directly or after the indicated period of post-cure treatment, to determine the strength of the bond formed therein. The lap-shear strength measurements were, in each case, made on one inch wide strips using ASTM method D 1002-64.

compounds, nitroso compounds, oxime compounds, imine compounds, metal-amine complexes and tertiary amine salts, corresponding to an epoxy adhesive amine curing agent; and said adhesive composition further contains a supporting electrolyte selected from the class consisting of quaternary ammonium salts.

6. A single pot, electrolytically conductive adhesive composition of claim 1 comprising a thermosetting synthetic organic resin adhesive and a curing agent precursor therefor.

7. A composition according to claim 6 wherein the resin is an epoxy adhesive; the precursor is a member selected from the class consisting of the carboxylic acid salt, nitro compounds, nitroso compounds, oxime compounds, imine compounds, metal-amine complexes and tertiary amine salts, corresponding to an epoxy adhesive amine curing agent; and said adhesive composition further containing a supporting electrolyte selected from the class consisting of quaternary ammonium salts.

8. A method for the electrochemical formation of the bonded structures of claim 1 comprising the consecutive steps of:

(a) applying a coating of electrolytically conductive adhesive containing a curing agent precursor for said adhesive between the surfaces of two electrically conductive members;

(b) curing said adhesive by passing an electric current through said conductive members to electrolytically convert said precursor to curing agent thereby forming a bond between said conductive members.

9. A method according to claim 8 wherein the coating is an epoxy adhesive containing a quaternary ammonium salt supporting electrolyte.

10. A method according to claim 9 wherein the precursor is a member selected from the class consisting of the carboxylic acid salts, nitro compounds, nitroso com-

TABLE II

| Example number | Curing agent precursor Compound | Wt. percent | Supporting electrolyte Compound | Wt. percent | Current, ma. | Coulombs | Post cure treatment | Lap-shear, p.s.i. |
|---|---|---|---|---|---|---|---|---|
| 19 | N-benzylidenemethylamine | 15 | $Et_4N^\oplus p\text{-}MeC_6H_4SO_3^\ominus$ | 2.5 | 5 | 4.7 | | 2,320 |
| 20 | $C_6H_5\text{-}N=N\text{-}C_6H_5$ | 5 | $Et_4N^\oplus p\text{-}MeC_6H_4SO_3^\ominus$ | 5 | 20 | 5.5 | (¹) | 1,800 |
| 21 | $C_6H_5\text{-}N=N\text{-}C_6H_5$ | 5 | $Et_4N^\oplus p\text{-}MeC_6H_4SO_3^\ominus$ | 5 | 0 | 0 | (¹) | 1,480 |
| 22 | Imidazole nickel nitrate | 3 | $Et_4N^\oplus p\text{-}MeC_6H_4SO_3^\ominus$ | 5 | 50 | 40 | (²) | 361 |

¹ 5 days at 100° C.
² 16 hrs. at 80° C.

I claim:

1. An article of manufacture comprising electrically conductive members having a coating of uncured electrolytically conductive adhesive compositions laminated between said members, wherein said adhesive contains an electrolytically activated curing agent precursor.

2. An article according to claim 1 wherein the electrically conductive members comprise two metallic sheets.

3. An article according to claim 1 wherein the electrically conductive members comprise a metallic support plate, a metallic honeycomb core and a metallic surface sheet.

4. An article according to claim 1 wherein an electrically conductive member is composed of graphite fibers.

5. An article according to claim 2 wherein the metallic sheets are composed of aluminum; the adhesive is an epoxy adhesive; the precursor is a member selected from the class consisting of the carboxylic acid salts, nitro pounds, oxime compounds, imine compounds, metal-amine complexes and tertiary amine salts, corresponding to an epoxy adhesive amine curing agent.

References Cited

UNITED STATES PATENTS

| | | | |
|---|---|---|---|
| 2,662,045 | 12/1953 | Baggott | 156—275 X |
| 2,742,390 | 4/1956 | Beck | 156—275 X |
| 2,902,589 | 9/1959 | Wirta | 161—68 X |
| 3,239,403 | 3/1966 | Williams et al. | 156—275 |
| 3,263,268 | 8/1966 | Flaherty | 156—275 X |
| 3,468,747 | 9/1969 | Tatnall | 161—167 X |

FOREIGN PATENTS

| | | | |
|---|---|---|---|
| 263,883 | 10/1963 | Australia | 156—275 |

WILLIAM A. POWELL, Primary Examiner

U.S. Cl. X.R.

156—275, 330, 335; 161—213

UNITED STATES PATENT OFFICE
CERTIFICATE OF CORRECTION

Patent No. 3,679,534            Dated   July 25, 1972

Inventor(s) Norman Louis Weinberg

It is certified that error appears in the above-identified patent and that said Letters Patent are hereby corrected as shown below:

Column 3, lines 31 and 32: "toluenesulfonate; other preferred compounds include" should read -- tetrabutylammonium perchlorate; tetraethylammonium p-toluenesulfonate; other preferred compounds include --.

Column 4, line 48: "Most of the alcohol is allowed to" should read -- Most of the alcohol is allowed to evaporate and then the substrates are brought together. --.

Column 6, lines 1 to 3:

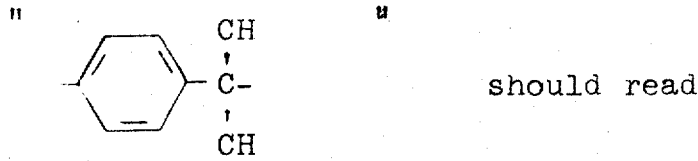

should read

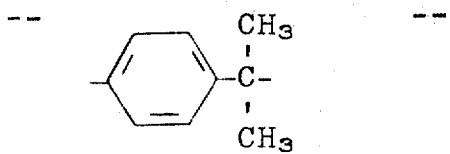

Column 6, line 52: "·HOCOCHC$_2$H$_5$C$_4$H" should read -- ·HOCOCHC$_2$H$_5$C$_4$H$_9$ --.

Signed and sealed this 26th day of December 1972.

(SEAL)
Attest:

EDWARD M. FLETCHER, JR.                ROBERT GOTTSCHALK
Attesting Officer                      Commissioner of Patents